Dec. 1, 1936.  M. ZIMIC  2,062,629

ADJUSTABLE PULLEY

Filed Oct. 17, 1935

INVENTOR.
MICHAEL ZIMIC
BY
ATTORNEYS

Patented Dec. 1, 1936

2,062,629

UNITED STATES PATENT OFFICE 2,062,629

ADJUSTABLE PULLEY

Michael Zimic, Forest Hills, N. Y.

Application October 17, 1935, Serial No. 45,390

1 Claim. (Cl. 74—230.17)

This invention relates to improvements in pulleys and has particular reference to a type of pulley employed for power transmission wherein the pulley sections are relatively adjustable to obtain variable speeds and to compensate for wear upon the driving belts engaged therewith.

An object of the invention is to provide a simple and practical pulley in which adjustments of a movable pulley section may be readily and easily effected through the medium of a contractile portion capable of gripping engagement with the member upon which said section is supported.

The above and other objects will appear more clearly from the following detailed description when taken in connection with the accompanying drawing which illustrates a preferred embodiment of the inventive idea.

Figure 1:
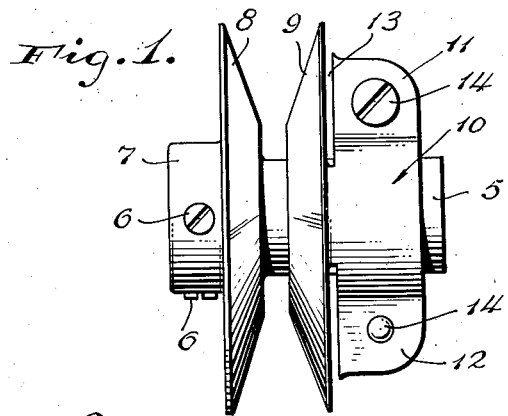
Figure 1 is an elevational view of the pulley constructed in accordance with the invention.
Figure 2:
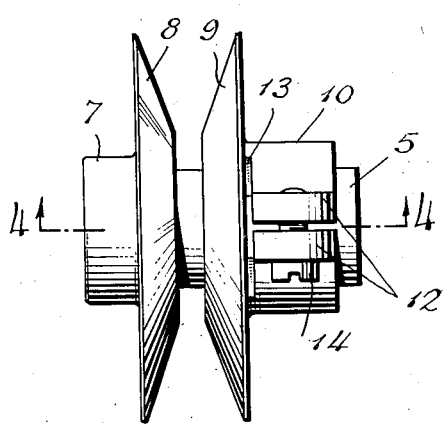
Figure 2 is a similar view taken at right angles to Figure 1.
Figure 3:
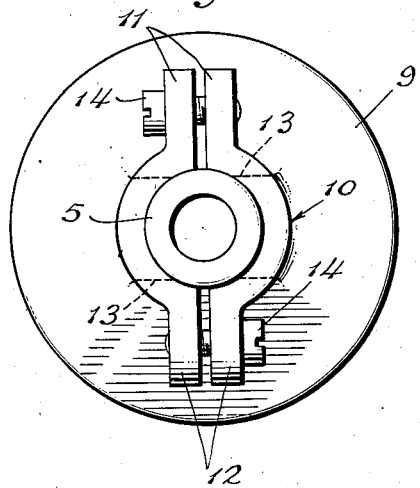
Figure 3 is an end elevation.
Figure 4:
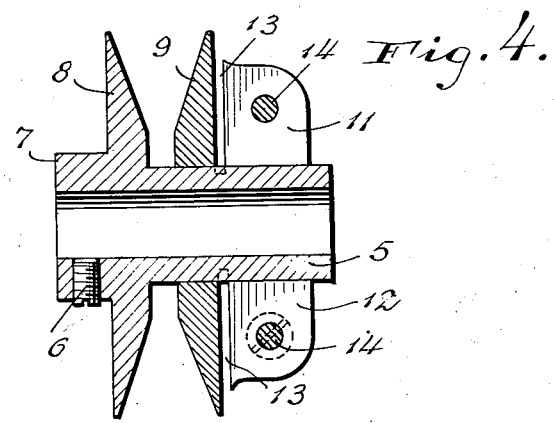
Figure 4 is a section on the line 4—4 of Figure 2.

Referring more particularly to the accompanying drawing, the pulley assembly is shown as comprising a supporting member in the form of a sleeve 5 through which a shaft is capable of being extended, with the sleeve secured thereto by means of set screws 6 threaded in apertures formed in the enlarged end 7 of said sleeve. Contiguous to said end, there is formed integrally with the sleeve a pulley section 8 with which cooperates a second pulley section 9 capable of longitudinal adjustment upon the sleeve 5 and attachment to said sleeve in various adjusted positions, as will be hereinafter described. The inner opposed surfaces of the pulley sections 8 and 9 are substantially conical in formation to accommodate the usual V-type of driving belt.

The novel means embodied in the present invention for securing the adjustable section 9 of the pulley in various longitudinal positions on the sleeve 5 preferably takes the form of a hub 10 extending from and made integral with the outer face of the section 9 and partially encircling the sleeve 5. The hub 10 is divided into two parts or sections by being split diametrically and each of these parts is provided with oppositely disposed and laterally extending clamping portions 11 and 12 which are opposed to and spaced from the similarly formed portions on the other part of the hub. In order to impart a small degree of flexibility to the portions 11 and 12 so that they may be drawn together and thereby contract the effective diameter of the hub, said portions 11 and 12 are spaced from the adjacent face of the pulley section 9, as indicated at 13. To so contract said hub two screws 14 are extended in opposite directions through the opposed pairs of clamping portions 11 and 12 in threaded engagement therewith so that when said screws are turned in the proper direction the portions 11 and 12, due to their flexibility, will be drawn toward each other and thus contract the parts of the hub 10 into gripping engagement with the sleeve 5 which extends through said hub, thereby securing the pulley section 9 in any desired adjusted position on said sleeve. It is obvious that by loosening the screws 14 the gripping engagement of the hub with the sleeve may be released and the section 9 readjusted to any desired position longitudinally of the sleeve and thereafter again secured thereto in the manner described.

What is claimed is:

A pulley comprising a sleeve having a pulley section thereon, a second pulley section adjustable on said sleeve and having formed thereon a hub split to provide opposed members of arcuate formation which combine to partially embrace said sleeve, each of said members having a central edge portion formed integrally with said second section with inner edges of the end portions of the member spaced from the latter section, and opposed flexible clamping portions spaced from each other and extending laterally from said end portions with the edges of said clamping portions adjacent said second section also spaced from the latter, and means connecting said opposed clamping portions to tighten the opposed members of said hub about said sleeve.

MICHAEL ZIMIC.